United States Patent
Georgiev et al.

(10) Patent No.: US 6,773,170 B1
(45) Date of Patent: Aug. 10, 2004

(54) METHOD AND DEVICE FOR CONNECTION AND ADJUSTMENT OF OPTICAL UNITS: ELEMENTS, MODULES, DEVICES, AND SYSTEMS

(76) Inventors: Goran Dimitrov Georgiev, Apartment 64, Zona B-19 Bl. 11-12, vhod A, et. 17, Sofia (BG), 1309; Alexander Eftimov Ivanov, Apartment 24, "Alei Wazrazhdane", No. 14, et. 6, Russe (BG), 7000

( * ) Notice: Subject to any disclaimer, the term of this patent is extended or adjusted under 35 U.S.C. 154(b) by 0 days.

(21) Appl. No.: 10/069,456
(22) PCT Filed: Aug. 2, 2000
(86) PCT No.: PCT/BG00/00022
§ 371 (c)(1),
(2), (4) Date: Feb. 26, 2002
(87) PCT Pub. No.: WO01/16635
PCT Pub. Date: Mar. 8, 2001

(30) Foreign Application Priority Data
Aug. 27, 1999 (BG) .............................................. 103695

(51) Int. Cl.⁷ ................................................ G02B 6/36
(52) U.S. Cl. ............................................ 385/90; 403/57
(58) Field of Search .............................. 385/91, 67, 90, 385/136; 403/59, 57

(56) References Cited

U.S. PATENT DOCUMENTS

| 4,997,254 A | * | 3/1991 | Ganev ......................... 385/90 |
| 5,095,517 A | * | 3/1992 | Monguzzi et al. ............. 385/90 |
| 5,351,330 A | * | 9/1994 | Jongewaard .................. 385/93 |
| 5,812,258 A | * | 9/1998 | Pierson ....................... 356/153 |
| 5,859,947 A | * | 1/1999 | Kiryuscheva et al. ........ 385/136 |

* cited by examiner

Primary Examiner—Hae Moon Hyeon
(74) Attorney, Agent, or Firm—Ira S. Dorman

(57) ABSTRACT

A device for interconnecting optical units includes three elements, namely a pair of carriers and an intermediate body having passages defining an optical path in the device. At least two of the three elements contains an optical unit. A hinge connects one of the carriers to the other carrier and/or the intermediate body for changing the shape and possibly the length of the optical path through the device. One of the carriers of the intermediate body is slidable transversely of the other elements for also changing alignment of the elements and consequently of optical units mounted therein.

12 Claims, 6 Drawing Sheets

METHOD AND DEVICE FOR CONNECTION AND ADJUSTMENT OF OPTICAL UNITS: ELEMENTS, MODULES, DEVICES, AND SYSTEMS

BACKGROUND OF THE INVENTION

1. Field of the Invention

The present invention relates to a device for adjustably interconnecting optical units.

The device of this invention finds application in optoelectronics, optomechanics, optical communications, instrument engineering, medical engineering, laboratory equipment, and all fields of technology using translation of visual signals between optical units (OU's)

2. Discussion of the Prior Art

SU 1723550A1 discloses a device for connection and adjustment of passive optical units, i.e. optical fibers. Optical fibers are arranged in pairs and fixed to carriers, one of which is movable. The two carriers with the optical units are connected in an optical channel isolated from the environment with guaranteed parallelism of the optical axes of the OU's through the channel. The OU carriers are oriented until the two OU's are coaxial. Orientation is carried out by repeated independent, rectilinear, stepwise shifts of the movable carrier in two planes, perpendicular to the axis of the carrier. The movable carrier is tightened and locked to the immovable carrier each shift increasing the locking force. Meanwhile, a running check is carried out with respect to orientation of the carriers and the degree of the optical channel sealing.

A shortcoming of the device is that it allows only parallel and coaxial adjustment of the carriers. Moreover, its operational possibilities and reliability are limited, especially at high temperatures and in harsh environments.

SU 883838 describes a device for OU connection and adjustment, i.e. a reflecting optical element (concave mirror) and an active optical element contained in a sealed optical channel. The reflecting element is fixed to a movable carrier opposite to the optical axis of an immovable carrier, the active optical element being fixed to the latter, while both OU carriers are connected in a sealed optical channel.

The device consists of rigid bodies only, i.e. two OU carriers and a third body which connects the carriers, the three bodies being connected so that they form a sealed optical channel or passage. Auxiliary rigid and resilient mechanical elements connect the bodies, while shifts of the movable carrier are effected by adjusting screws.

A drawback of the device is restricted applicability. The device can be used only for reflecting OU and for spatial and angular OU adjustment, because there is no means of connecting other OU's perpendicular to the optical axis. Another drawback of the device is its low operational reliability because of complicated construction which makes it not resistant to vibration and shock.

CA 1258786 discloses a device for connection and adjustment of fibers. OU's are arranged in pairs and fastened to carriers at a distance from each other. At least one of the carriers is movable. The two carriers with the OU's fastened thereto are connected through a third, intermediate body, so that the three bodies form an optical channel. The bodies forming the optical channel and carrying a pair of OU's are angularly oriented until they are positioned for optimal transmission of visual signals. The bodies are oriented by means of an iterative series of rectilinear stepwise shifts and locking of a movable OU carrier or carriers (where both carriers are movable). The shifts and locking are accompanied by a running check of the relative position of the optical axes of the OU's. Each angular displacement of a body is preceded by a partial release from locking, and is followed by a new, stronger locking and a check of the relative position of the bodies.

When the optical channel defined by three bodies is to be isolated from the environment, the last operation, i.e. the angular shift and the locking of the movable body, is followed by a final check as to whether the mechanical links between the bodies forming the channel are sealed.

The device includes at least three bodies for each OU pair. The bodies are connected to form an optical channel open to or isolated from the environment or communicating therewith. At least two bodies having central holes define the opening of an optical channel, the axis of which is rectilinear, angular or branched from a common point. Each of the two end bodies has a bearing surface for an OU. One of the bodies, which is fixed, is a housing having an attachment surface for mounting of the device on a panel or apparatus. The two OU's are locked to the bodies at a distance one from each other. The bodies are connected by an intermediate, flexible body and two types of screws. The screws are placed in the fixed carrier. When orienting the OU carrier, the center of angular displacement changes towards the body depending on variable deformation of the intermediate body.

A basic drawback of the device is the fact that it permits restricted spatial orientation of the carriers, only by means of angular shifts of the movable carrier(s). The device is thus limited to OU connection and adjustment for the purpose of optical beam communication and reflection in small angular ranges. Another drawback of the device are low precision due to restricted angular displacement of the movable body (s). The main drawback of the device is restricted functional possibilities because it is suitable for use with optical and optoelectronic elements only (fibers, reflectors), small angles being enough for the adjustment thereof, due to the limited spatial orientation of its carriers and the restricted possibilities for external mounting. The device is not capable of adjusting the orientation of optical elements having optical axes requiring substantial angular deflections.

An object of the present invention is to provide a solution to the problems inherent in existing apparatuses of the type described above in the form of a relatively simple device for adjustably interconnecting optical units which is easy to adjust, and which lends itself for use with a wide variety of optical units.

GENERAL DESCRIPTION OF THE INVENTION

Accordingly, the present invention relates to a device for interconnecting optical units comprising a first carrier, a second carrier, an intermediate body between said first and second carriers, said first and second carriers and said intermediate body having central axes, at least two of said carriers and said intermediate body being adopted to support an optical unit; passages in at least two of said first and second carriers and said intermediate body defining an optical path, a hinge rotatably connecting one of said first and second carriers to the other of said first and second carriers and said intermediate body; first screw means for causing rotation of said one carrier relative to said other carrier and said intermediate body to change the shape and length of said optical path; and second screw means for causing at least one of said first and second carriers and said intermediate body to move transversely of the optical path to change the alignment of said central axes and the shape of the optical path.

The three elements listed above, i.e., the two carriers and the intermediate body are rigid, and are actually connected by a hinge. One carrier or the intermediate body is slidable with respect to the other carrier for movement transversely thereof. The contact surfaces of the hinge are either part of a sphere and a right circular cylinder, part of a cylinder and a parallelepiped or a cube, or part of a concave ellipse and an elliptical cylinder. The spacial relationship between the carriers and the intermediate body is adjusted by means of a plurality of screws arranged in pairs. Orientation of the three elements is effected by stepwise movement of the elements relative to each other. Because of the reaction forces between the screws and the elements, the screws also serve to lock the elements in one position. Some of the coupling and adjustment screws can be replaced by springs. The screws or springs are arranged in groups according to their function, i.e. for effecting rectilinear or angular adjustment of one or more of the elements of the device. The axes of the first screws intersect and are perpendicular to the axes of the second screws when the elements are centered and aligned.

BRIEF DESCRIPTION OF THE DRAWINGS

The invention is described below in greater detail with reference to the accompanying drawings which illustrate preferred embodiments of the invention, and wherein.

DESCRIPTION OF THE PREFERRED EMBODIMENT

Figures 1, 2:
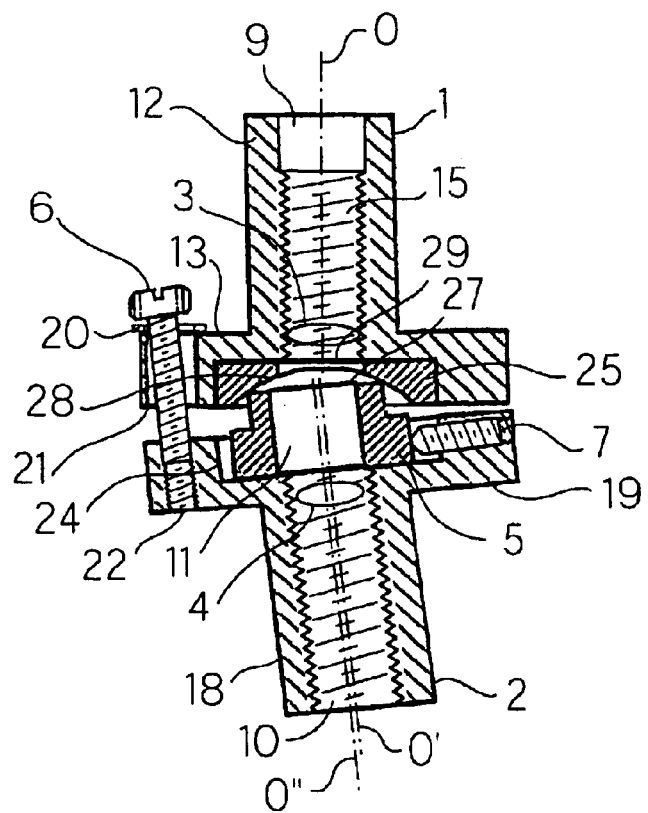
FIGS. 1 to 10 are schematic, sectional views of various embodiments of the device of the present invention.

With reference to FIG. 1, a first embodiment of the device of the present invention includes three elements, namely two carriers 1 and 2 for optical units 3 and 4, and an intermediate body 5. The elements 1, 2 and 5 are interconnected by screws 6 and 7. The three elements have central passages 9, 10 and 11 with central, longitudinal axes 0, 0' and 0", respectively which define an optical channel or path in the device. The optical path, which is rectilinear, is isolated from or communicates with the environment.

The carrier 1 has a tubular body 12, with a flange 13 on one end thereof. The interior of the body 12 has a smooth outer end and threads 15 at the inner end thereof for mounting the optical unit 3. The outer surface of the body 18 and the flange 19 are smooth for mounting the device on an apparatus or panel (not shown). The carrier 2 also has a tubular body 18 with a flange 19 at one end opposing the flange 13 of the carrier 1. The carriers 1 and 2 are interconnected by a plurality of spaced apart screws 6 (one shown) extending through a washer 20 and a large hole 21 in the flange 13 of the carrier 1 into a threaded bore 22 in the flange 19 of the carrier 2. The large hole 21 permits tilting of the carrier 2 with respect to the carrier 1.

The intermediate body 3 is slidably mounted in a recess 24 in the flange 19 for movement transversely of the longitudinal axes of the carriers 1 and 2. The location of the body 5 in the recess 24 is controlled by the screws 7. The screws 6 and 7 are arranged in groups with their longitudinal axes intersecting.

The carrier 2 and the intermediate body 5 are tilted with respect to the carrier 1 by a hinge defined by an insert 25 in the flange 13 and the free end 27 of the body 5. The insert 25 has a concave recess 28 for rotatably receiving the free end of the body 5, and a central hole or passage 29 aligned with the passage 9 through the body 12 of the carrier 1.

The contact surfaces of the hinge, i.e. the recess 28 and the free end of the inter mediate body 5 are part of a sphere and one end of a right circular cylinder, respectively. Alternatively, the contact surfaces are cylindrically concave and one end of a parallelepiped or a cube, or part of an ellipse and one end of an elliptical cylinder.

In effect, the concave contact surface of the hinge, i.e. the recess 28 is part of the carrier 1 with the longitudinal axis or axis of symmetry 0 on the longitudinal axis 0" of the intermediate body 5, when the two are aligned, or has a longitudinal axis 0 intersecting the axis of symmetry 0" of the body 5 when the carrier 2 and the body 5 are tilted or inclined with respect to the carrier 1. It will also be appreciated that the longitudinal axis 0" of the intermediate body 5 can be shifted transversely with respect to the longitudinal axes 0 and 0' of the carriers 1 and 2 so that the axes 0, 0' and 0" of the three elements are not aligned, i.e. are inclined with respect to each other. Thus, the shape, length and direction of the optical passage through the device can be altered by adjusting the screws 6 and 7. By changing the angles between the axes 0, 0' and 0", the shape of the optical passage through the three elements of the device is changed. The angle and possibly the length of the optical passage are changed by means of the adjustment screws 6. When the alignment of the axes 0, 0' and 0" is changed by adjusting the screws 7, the shape and direction of the optical passage changes.

With reference to FIG. 2, a second embodiment of the invention includes first and second carriers 31 and 32, respectively and an intermediate body 33 which are adjustably interconnected by screws 6 and 7. Passages 35, 36 and 37 in the two carriers 31, 32 and the intermediate body 33, respectively define an optical passage, which is isolated from or communicates with the atmosphere. The carrier 31 includes a flat body 39 containing a recess 40 for slidably receiving the intermediate body 33. The carrier 32 is cylindrical with an annular flange 42 intermediate the ends thereof for receiving the screws 6, which extend through large washers 43 and holes 44 into threaded holes 45 (one of each shown) in the carrier 31 to interconnect the carriers 31 and 32. One end of the carrier 32 is rotatable in a concave recess 46 in the body 33.

The intermediate body 33 is moved transversely of the carrier 31 by means of the screws 7.

The passages 35 and 36 through the carriers 31 and 32, and the passage 37 through the intermediate the body 33 have longitudinal axes 0, 0' and 0", respectively. The axes 0' and 0" are moved laterally with respect to the axis 0 when the body 33 is slid transversely in the recess 40. The axes 0, 0' and 0" can be aligned or (as illustrated schematically in FIG. 2), inclined with respect to each other by adjustment of the screws 6. As in the device of FIG. 1, the screws 6 and 7 are arranged in groups, and adjustment of the length, direction and shape of the optical passage through the device is effected in the same manner as with the first embodiment of the device.

Figure 3:
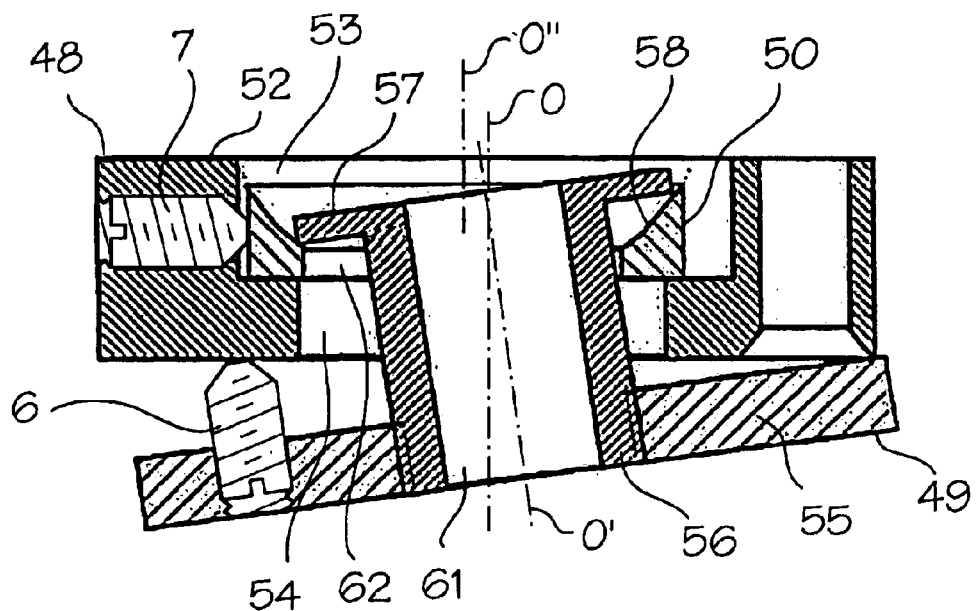

Referring to FIG. 3, a third embodiment of the invention includes a first carrier 48, a second carrier 49 pivotally connected to the carrier 48 and an intermediate body 50. The first carrier 48 is defined by a block with a flat surface 52 for connecting the carrier to an apparatus or panel (not shown). The intermediate body 50 is slidably mounted in a recess 53, which defines part of a central passage 54 in the carrier 48, for lateral or transverse movement by adjustment screws 7.

The carrier 49 includes a plate 55 and a cylindrical tube 56 mounted therein. The carrier 49 is pivotally connected to the intermediate body 50 and the carrier 48 by a flange 57 on the free end of the tube 56 which is rotatable in a concave recess 58 in the intermediate body 50. The carriers 48 and 49 and the body 50 have central passages 54, 61 and 62, respectively with longitudinal or central axes 0, 0' and 0'', respectively. The simultaneous alignment of the axes and self locking of the three elements can be changed using the screws 6 and 7. Thus, longitudinal and transverse adjustments of the carriers 48 and 49 and tilting of the axes of the elements of the device are effected using screws 6 and 7 in essentially the same manner as in the first two embodiments of the device.

Figure 4:
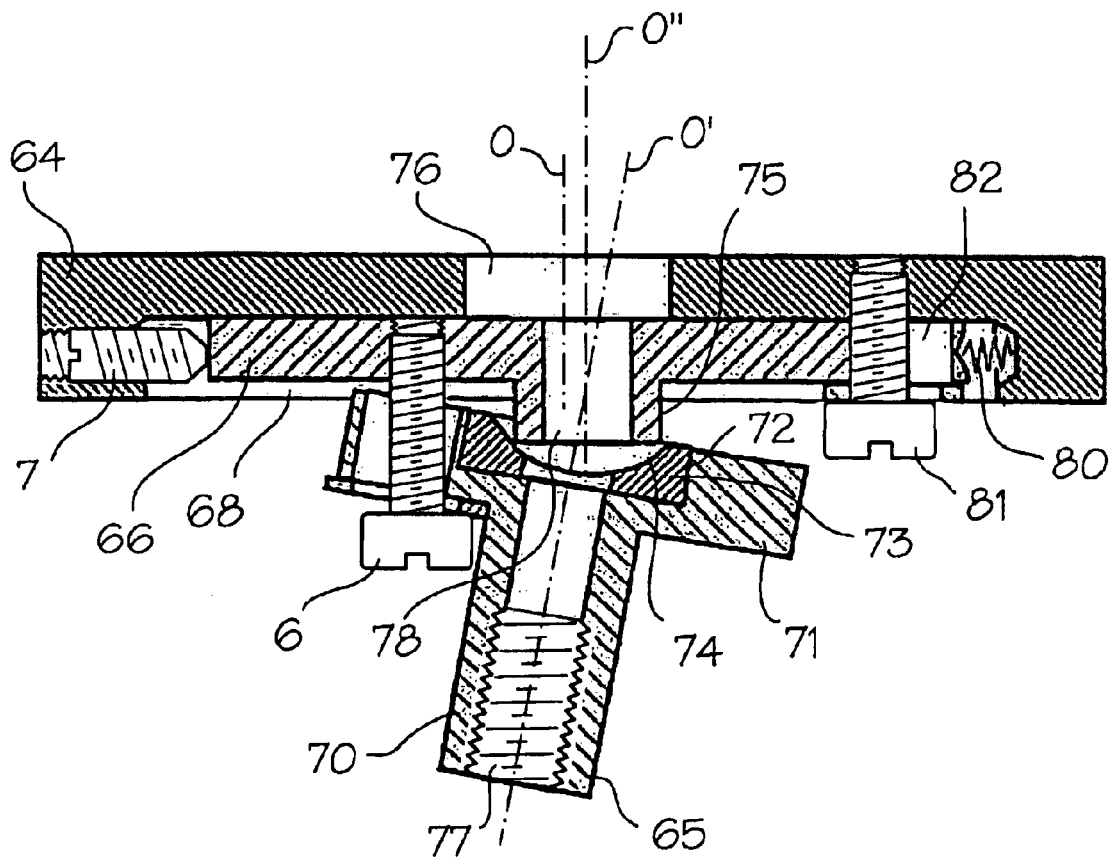

A fourth embodiment of the invention (FIG. 4) includes first and second carriers 64 and 65, respectively and an intermediate body 66 slidably mounted in a recess 68 in the first carrier 64. The first carrier 64 is similar to the carrier 48 of the third embodiment of the invention, except that the recess 68 faces the second carrier 65. The second carrier 65 is similar to the carrier 2 of the first embodiment of the invention, including a tubular body 70 and a flange 71 on one end thereof. A recess 72 in the flange 71 contains a hinge member defined by an insert 73, which has a concave bearing surface 74 for pivotally supporting a sleeve 75 extending outwardly from the intermediate body 66.

Passages 76, 77 and 78 in the carriers 64 and 65, and in the intermediate body 66, respectively have longitudinal axes 0, 0' and 0''. The spacing between the carriers 64 and 65, the angle between the axes 0, 0' and 0'' and the alignment thereof can be altered by rotation of the screws 6 and 7. The intermediate body 66 is biased towards the screws 7 by springs 80 (one shown) mounted in opposed recesses in the carrier 64 and the intermediate body 66. A screw 81 extending through a slot 82 in the body 66 into the carrier 64 guides the body 66 in the carrier body recess 68.

Figure 5:
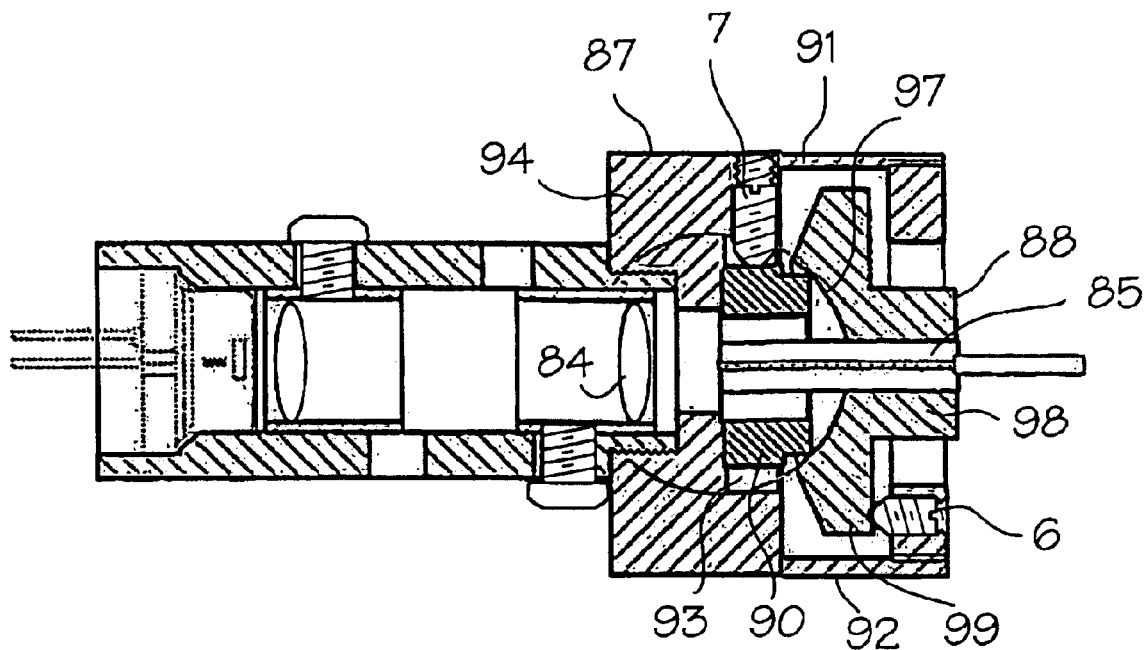

Referring to FIG. 5, in the fifth embodiment of the invention, optical units 84 and 85 are mounted in first and second carriers 87 and 88, respectively which are pivotally interconnected by a tubular intermediate body 90. The first carrier 87 includes a housing 91 having an outer surface 92 for mounting the carrier on an apparatus or panel. One end of the intermediate body 90 is slidable in a recess 93 in one end 94 of the housing 91. The body 90 can be moved laterally in the first carrier 87 by screws 7 (one shown). The other end of the body 90 extends into a concave recess 97 in the second carrier 88. The second carrier 88 is rotated relative to the first carrier 87 and the intermediate body 90 by screws 6 (one shown). The carrier 87 includes a tubular body 98 with a flange 99 on one end thereof containing the recess 97. The screws 6 engage the flange 99 at spaced apart locations.

Figure 6:
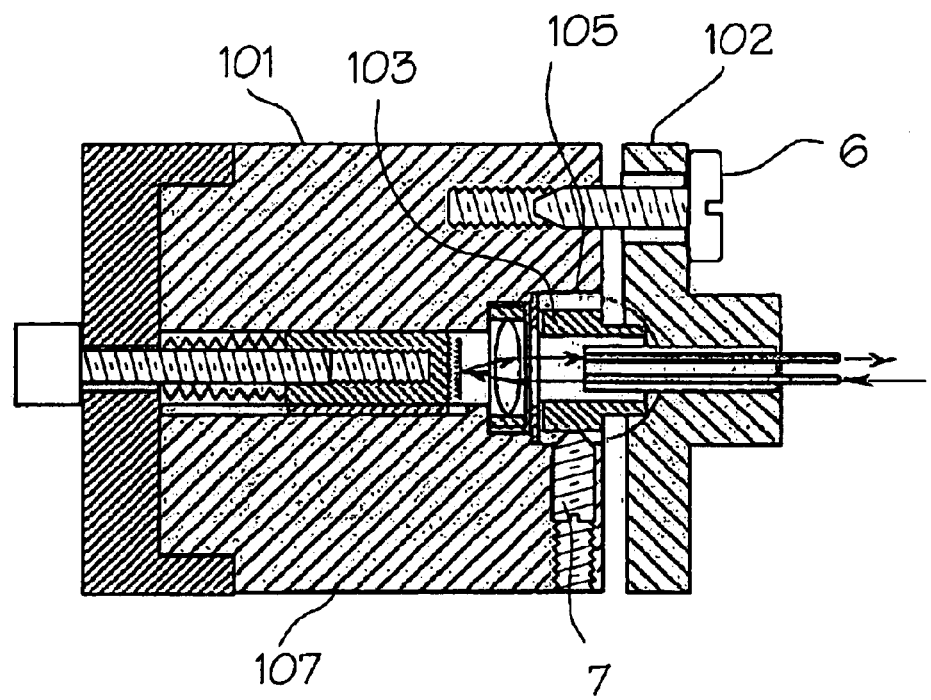

As shown in. FIG. 6, a sixth embodiment of the invention includes first and second carriers 101 and 102, respectively interconnected by screws 6, and an intermediate body 103 slidably mounted for transverse movement in a recess 105 in the first carrier 101. The body 103 is moved transversely in the recess 105 by screws 7. Adjustment of the device, i.e. altering of the optical passage through the device of FIG. 6 is the same as in the other embodiments of the invention described above. Like the carriers of other embodiments, the carrier 101 has a smooth outer surface 107 for mounting the device on an apparatus or panel.

Figure 7:
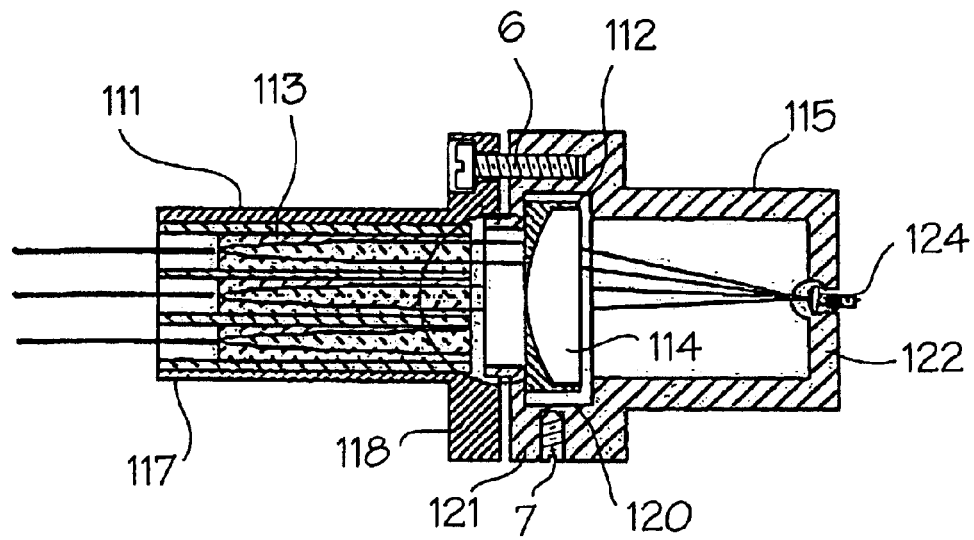

The embodiment of the invention shown in FIG. 7 includes first and second carriers 111 and 112 for optical units 113 and 114, respectively and an intermediate body 115. The carrier 111 is structurally similar to the carrier 1 of FIG. 1 including a tubular body 117 and a flange 118 at one end thereof through which pass the screws 6. The first carrier 111 contains a concave recess 119 for rotatably supporting one end of the intermediate body 115. By adjusting the screws 6, the body 115 and the second carrier 112 are rotated relative to the first carrier 111. The carrier 112 includes a concave recess for housing the optical unit 114. The carrier 112 is slidably mounted in a compartment 120 in the intermediate body 115. Screws 7 are used to adjust the lateral or transverse position of the carrier 112 in the compartment 120. A flange 121 at one end of the body 115 receives the screws 6 and 7 for tilt/lateral adjustment of the position of the second carrier 117 in the intermediate body. A second end wall 122 of the body 115 contains a seat for a third optical unit 124.

Figure 8:
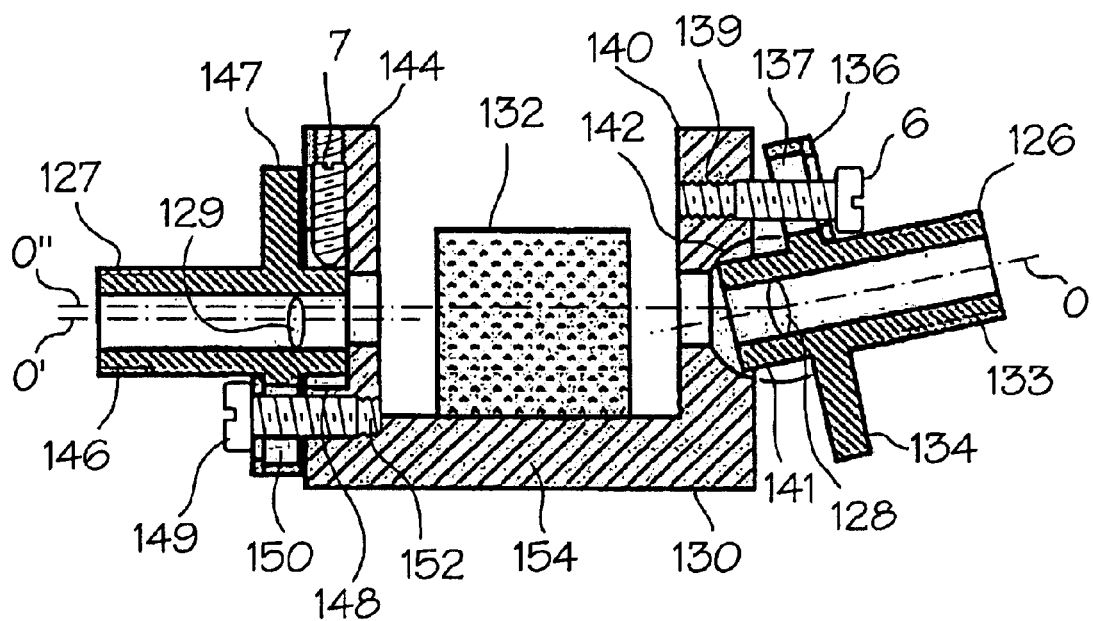

With reference to FIG. 8, an eighth embodiment of the invention includes first and second pairs of carriers 126 and 127 for optical units 128 and 129, respectively, and a generally U-shaped intermediate body 130 carrying a third optical unit 132. The carrier 126 is similar to the carrier 32 of FIG. 2, including a tubular body 133 and a flange 134 intermediate the ends thereof. Screws 6 extend through washers 136 and large holes 37 in the flange 134 into threaded bores 139 in one end wall 140 of the intermediate body 130. One end 141 of the carrier 126 is pivotally mounted in a concave socket or recess 142 in the end wall 140. Adjustment of the angle of the carrier body 133 with respect to the intermediate body 130 is effected using the screws 6.

The second carrier 127 is slidably mounted in a second end wall 144 opposed to the end wall 140 of the generally U-shaped intermediate body 130 perpendicular to the optical path. The carrier 127 is similar to the carrier 126, including a tubular body 146 and a flange 147 intermediate the ends of the body. One end of the body 146 is slidably mounted for transverse movement in a recess 148 in the end wall 144 of the intermediate body 130. The position of the carrier 127 in the recess 148 is controlled by screws 7. The carrier 127 is positioned in the recess 148 by a screw 149 extending through a slot 150 in the flange 147 into a threaded bore 152 in the intermediate body 130. The third optical unit 132 is mounted on the base 154 of the body 130.

Figure 9:
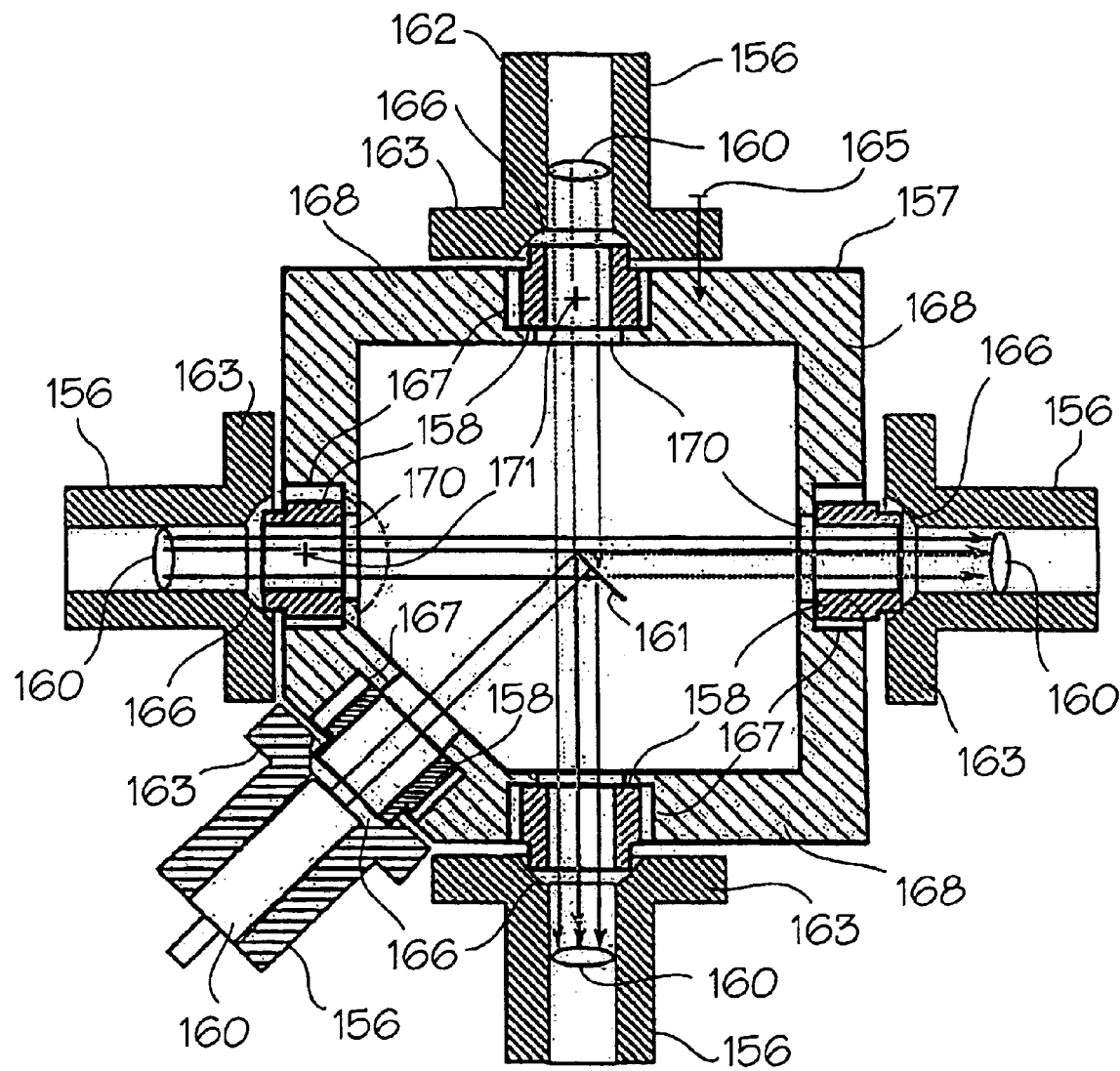

The device of FIG. 9 includes a plurality of first carriers 156, a second carrier 157 and a plurality of intermediate bodies 158 pivotally connecting the carrier 156 to the carrier 157. Optical units 160 and 161 are mounted in the carriers 156 and 157, respectively. Each first carrier 156 includes a tubular body 162 with a flange 163 on one end thereof The second carrier 157 is in the form of a polygonal housing with an intermediate body 158 in each wall thereof. Each first carrier 156 is connected to the second carrier 157 by screws 165 (one represented schematically by an arrow) extending through the flange 163. Each first carrier 156 includes a concave recess 166 for receiving an outer end of an intermediate body 158.

Each intermediate body 158 is slidably mounted in a recess 167 in a side wall 168 of the polygonal second carrier 157. The intermediate bodies 158 are moved transversely of the longitudinal axes of passages 170 in the side walls 168 of the polygonal second carrier 157, i.e. perpendicular to the optical paths through the carriers and the intermediate bodies 158 by screws 171 (two represented schematically by crosses).

Figure 10:
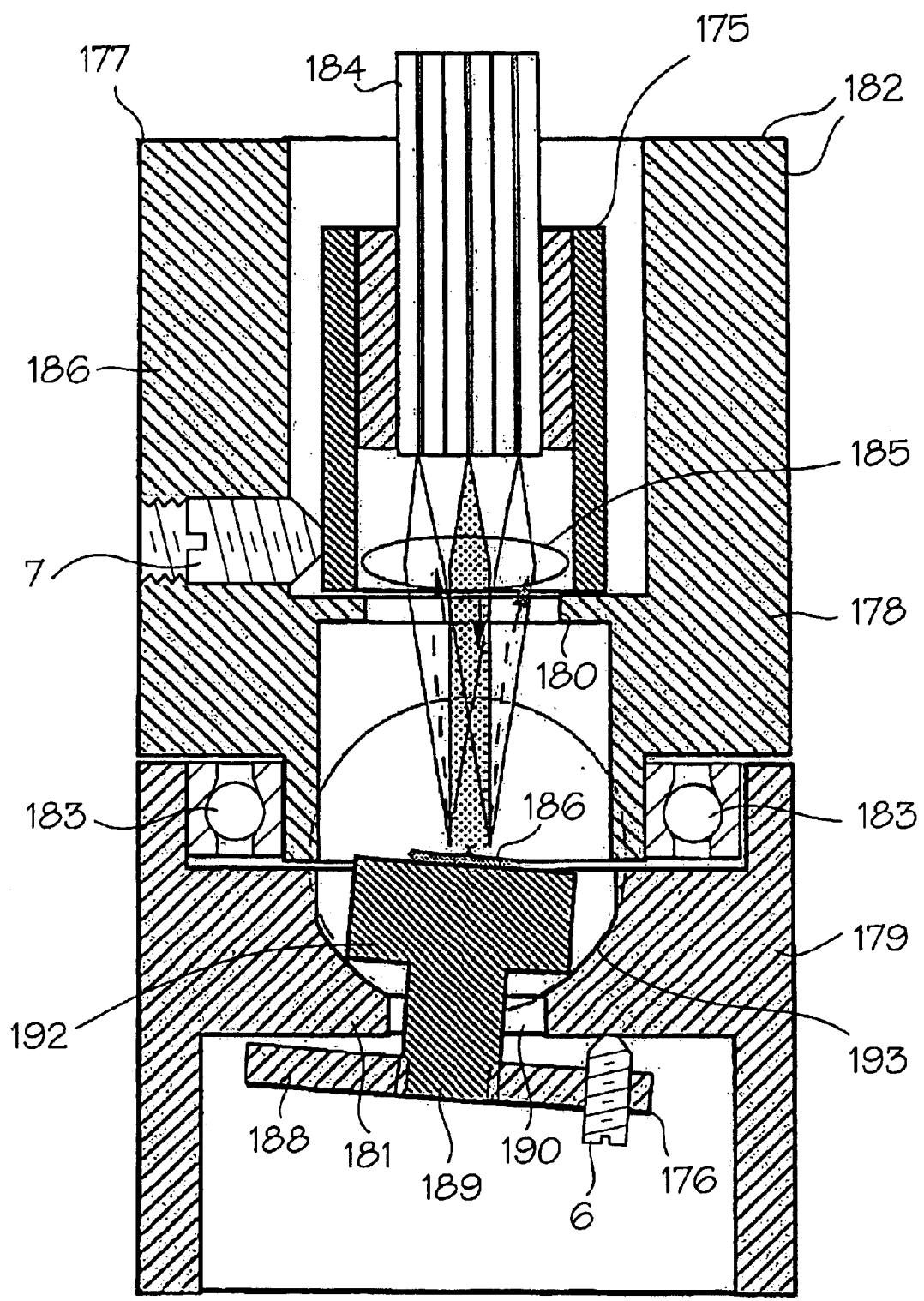

With reference to FIG. 10, a tenth embodiment of the invention includes first and second carriers 175 and 176 mounted in opposite ends of an intermediate body 177. The body 177 is in the form of a two-piece, tubular housing, one piece 178 of which contains the first carrier 175, and the other piece 179 of which contains the second carrier 176. The first carrier 175 is slidably mounted on a partition 180, and the carrier 176 is rotatably mounted on a partition 181. The two pieces of the intermediate body 177 are rotatably-interconnected by bearings 183. As in other embodiments of the invention, the body 177 has outer surfaces 182 for attachment of the device to an apparatus or panel.

Optical units 184 and 185 are mounted in the tubular first carrier 175, and an optical unit 186 is mounted on an inner end of the second carrier 176. The first carrier 175 is moved laterally in the intermediate body 177 by adjusting screws 7 (one shown) which extend through a side wall 186 of the body 177 into engagement with the carrier 175.

The second carrier 176 includes a plate 188 on one end of a body 189, which extends through an opening 190 in the second piece 179 of the intermediate body 177 into a compartment defined by opposed recesses in the two pieces of the intermediate body 177. A flange 192 on the inner end of the body 189 is pivotally mounted in concave recess 193 in the partition 181.

What is claimed is:

1. A device for interconnecting optical units comprising a first carrier, a second carrier, an intermediate body between said first and second carriers, said first and second carriers and said intermediate body having central axes, at least two of said carriers and said intermediate body being adapted to support an optical unit; passages in at least two of said first and second carriers and said intermediate body defining an optical path, a hinge rotatably connecting one of said first and second carriers to the other of said first and second carriers and said intermediate body; first screw means for causing rotation of said one carrier relative to said other carrier and said intermediate body to change the shape of said optical path; and second screw means for causing at least one of said first and second carriers and said intermediate body to move transversely of the optical path to change the alignment of said central axes and the shape of the optical path.

2. The device of claim 1, including passages in both said carriers and in said intermediate body defining said optical path through the device; a recess in said second carrier slidably supporting said intermediate body, said first carrier rotatably receiving said intermediate body, said first screw means extending between said first and second carriers, and said second screw means being located in said second carrier and extending into engagement with said intermediate body for moving the intermediate body laterally of the second carrier.

3. The device of claim 1, including passages in both said carriers and in said intermediate body defining said optical path through the device; a recess in first said first carrier slidably supporting said intermediate body, said intermediate body rotatably receiving said second carrier; said first screw means extending between said second and first carriers, and said second screw means being located in said first carrier and extending into engagement with said intermediate body for moving the intermediate body and said second carrier transversely of the optical path.

4. The device of claim 1, including passages in both said carriers and in said intermediate body defining said optical path through the device; a recess in said first carrier slidably supporting said intermediate body, said hinge rotatably connecting said second carrier to said intermediate body; said first screw means extending between said second carrier and said intermediate body for causing rotation of said second carrier relative to said first carrier and said intermediate body; and said second screw means being located in said first carrier and extending into engagement with said intermediate body for moving said intermediate body and said second carrier transversely of said first body and consequently of the optical path through the device.

5. The device of claim 4 including a slot in one side of said intermediate body, and third screw means extending through said slot into said first carrier for guiding said intermediate body in said recess in said first carrier.

6. The device of claim 4 including spring means in said recess in said first carrier for biasing said intermediate body towards said second screw means.

7. The device of claim 1 including passages in both said carriers and in said intermediate body defining said optical path, said first carrier including a housing for said second carrier and said intermediate body; an interior recess in one end of said housing slidably receiving said intermediate body for transverse movement; and a concave recess in said second carrier for rotatably connecting said second carrier to said intermediate body in said housing, said first screws means extending between said first and second carriers for rotating said second carrier in said housing, and said second screw means extending between said first carrier and said intermediate body for sliding said intermediate body laterally in said housing.

8. The device of claim 1 including passages in said first and second carriers and in said intermediate body defining said optical path, said first carrier rotatably receiving one end of said intermediate body, said intermediate body defining a housing slidably supporting said second carrier in one end thereof, said first screw means extending between said first carrier and said intermediate body for causing rotation of said intermediate body and said second carrier relative to said first carrier, and said second screw means extending through a side of said intermediate body into engagement with said second carrier for moving the second carrier transversely of the intermediate body.

9. The device of claim 1, wherein said intermediate body includes a base for supporting a first optical unit, and a pair of opposed end walls, a first recess in one said end wall rotatably supporting said first carrier containing a second optical unit; a second recess in a second said end wall slidably receiving said second carrier containing a third optical unit, said first screw means extending between said first carrier and said one end wall for rotating the first carrier relative to the intermediate body, and said second screw means being located in said second end wall and extending into engagement with said second carrier for sliding said second carrier transversely of said intermediate body.

10. The device of claim 8, including guide means for guiding movement of said second carrier perpendicular to said optical path.

11. The device of claim 1, wherein said second carrier is a polygonal housing for containing a first optical unit; said housing including a plurality of side walls; recesses in said side walls slidably supporting intermediate bodies for movement perpendicular to optical paths through said first and second carriers and said intermediate body; said intermediate bodies rotatably supporting first carriers containing second optical units, said first screw means extending between said first and second carriers for rotating said first carriers relative to said intermediate body and said second carrier, and said second screw means extending through said second carrier side walls into engagement with said intermediate bodies for moving the intermediate bodies perpendicular to the optical paths.

12. The device of claim 1, wherein said intermediate body is a two-piece, tubular housing including a first piece carrying said first carrier and a second piece carrying said second carrier; and bearing means rotatably interconnecting said first and second pieces of said housing for rotation around an axis of an optical path through the housing; a first partition in said first housing piece slidably supporting said first carrier, and a second partition in said second housing piece rotatably supporting said second carrier, said first screw means extending between said second carrier and said second partition for rotating said second carrier relative to said intermediate body, and said second screw means extending through a side of said first housing piece into engagement with said first carrier for moving the first carrier perpendicular to an optical path in said first carrier and said intermediate body.

* * * * *